(12) United States Patent
Brown

(10) Patent No.: US 6,825,435 B1
(45) Date of Patent: Nov. 30, 2004

(54) POWER SUPPLY AND CONTROL EQUIPMENT FOR A RESISTANCE WELDING MACHINE

(76) Inventor: Lyndon Brown, 75 Chalet Cr., London, ON (CA), N6K 3G5

( * ) Notice: Subject to any disclaimer, the term of this patent is extended or adjusted under 35 U.S.C. 154(b) by 0 days.

(21) Appl. No.: 10/387,766

(22) Filed: Mar. 12, 2003

Related U.S. Application Data

(60) Provisional application No. 60/363,664, filed on Mar. 12, 2002.

(51) Int. Cl.[7] .................................................. B23K 11/26
(52) U.S. Cl. ....................................................... 219/112
(58) Field of Search ................................. 219/112, 113, 219/108, 110, 130.33

(56) References Cited

U.S. PATENT DOCUMENTS

| | | | | |
|---|---|---|---|---|
| 4,182,949 A | * | 1/1980 | Powers et al. | 219/113 |
| 5,149,933 A | * | 9/1992 | Donner | 219/113 |
| 6,303,894 B1 | * | 10/2001 | Laser et al. | 219/112 |
| 6,365,874 B1 | * | 4/2002 | Stava | 219/130.33 |
| 6,459,065 B2 | * | 10/2002 | Watanabe | 219/113 |
| 2001/0047982 A1 | * | 12/2001 | Watanabe | 219/110 |

FOREIGN PATENT DOCUMENTS

GB        2316244 A   *  2/1998

* cited by examiner

Primary Examiner—Clifford C. Shaw
(74) Attorney, Agent, or Firm—Gray Cary Ware & Freidenrich LLP

(57) ABSTRACT

A power supply and control equipment for a resistance welding machine including a battery, battery charger, transistor or mechanical switches, pulse width modulation controller, a unit for generating either constant or time varying power, voltage, or current references.

31 Claims, 3 Drawing Sheets

POWER SUPPLY AND CONTROL EQUIPMENT FOR A RESISTANCE WELDING MACHINE

This application claims the benefit of U.S. Provisional Application No. 60/363,664, filed Mar. 12, 2002.

FIELD OF THE INVENTION

The present invention relates to welding machines, and more particularly to resistance welding machines

BACKGROUND OF THE INVENTION

The present invention relates to generation of the power used in resistance spot welding. The resistance spot welding process involves bringing two electrodes under suitable force in contact with two pieces of material. An electric current is then passed through the electrodes generating enough resistive heat to form a weld.

Many existing approaches exist to generate the electric current. The most common maybe AC power, but two other supplies are mid frequency DC, and capacitive power supplies. AC power supplies typical use commercial power and use a step down transformer to lower the voltage level to a level appropriate for welding. The amount of heat supplied is typically controlled with SCR rectifiers on the primary side of transformer. The SCR allow the controller to delay the start of each half cycle of the AC waveform. Control is limited to every half cycle of the commercial power and in order to avoid transformer saturation, pairs of half cycles are often restricted to identical duty cycles. As weld durations are a few tens of power cycles, or less, very little control action is permitted.

Mid-frequency DC welders provide for greater flexibility in adjusting the power supplied to the weld. FIG. 3 displays a prior art mid frequency power supply. Commercial power (1) is rectified (2) and filtered (3,4,6). An inverter (7) converts it to an AC waveform with frequency on the order of 1–10 kHz. The transformer then steps down the voltage (and steps up the current) to levels appropriate for welding. Normally this is rectified on the secondary side of the transformer (not shown) and the power flows through the electrodes. Power at 1–10 kHz frequency can not flow to the electrodes, as at these frequencies, the inductive impedance vastly exceeds the resistive load. Current is measured at (12) compared to a reference (15) and is used in a feed back loop to control (16) the portion of the switching period when no current flows in the primary side of the transformer. Note that because of the Peltier effect, when welds are made with a DC current, greater heat is generated at one electrode interface and possibly at some weld interfaces than at others, leading to reduced life of one electrode and possible asymmetrical welds. In order to avoid this problem, the current reference signal can be multiplied (37) by a trapezoidal signal (36) with frequency between 10–100 Hz. By using a transformer with significant leakage reactance, the transformer will filter the pulse width modulation and provide a low frequency waveform that the transformer can step down. However, care must still be taken to avoid transformer saturation with its associated damage, and significant noise may be generated.

An alterative means for providing power for welding is via capacitor discharge. Traditional capacitor weld power supplies charge a capacitor to a fixed energy level and then allow this energy to be discharged through the weld electrodes. It is difficult to modify the temporal shape of the power supplied or respond to variations in the work pieces. In FIG. 4, a prior art control apparatus is shown that uses PWM techniques to control the discharge of the capacitor. The voltage across the capacitor will continuously decrease as the capacitor discharges complicating the pulse width modulation control problem. Very large capacitors (on the order of 1F) are required for this approach.

SUMMARY OF THE INVENTION

The object of this invention is a weld power supply that allows flexibility and precise control of the weld power supplied, while avoiding the significant cost and weight associated with transformers and capacitors used in the prior art. The power supply will be built around a high current capacity battery. The battery can be charged without resort to a large, heavy costly transformer and provides power at a more uniform level than a discharging capacitor. Charging requirements for a battery will need to be met only over the average of a cumulative number of welds rather than for each instantaneous weld.

One aspect of this invention consists of:
1) A battery;
2) A battery charger;
3) Switching device(s) such as power MOSFET, IGBT etc., either alone or a plurality in parallel between battery and welding load;
4) Diode(s) (either alone or a group in parallel) in parallel with weld load to provide an alternative unsourced current path;
5) Pulse width modulation control device;
6) A device to measure some aspect of the electrical power or weld process;
7) A reference signal generator.

The battery provides the energy via the switching device to form the weld. The switching devices are turned on and off by the pulse width modulation controller at some predetermined frequency which may either be fixed or time varying. Some aspect of the weld is measured, compared to a reference and used to adjust the ratio of the on/off time of the switch. Diode(s) provide a low impedance current path when the switches are non-conducting. The battery is recharged via a charger connected to commercial power supply.

Another aspect of this invention consists of:
1) Battery;
2) A battery charger;
3) Four groups of switching device(s) such as power MOSFET, IGBT etc., arranged in an H-bridge configuration. Each group can be either a single switch or a plurality in parallel;
4) Diode(s) (either alone or a group in parallel) in parallel with at least two switches in the H-Bridge configuration to provide unsourced current paths. These may be integral to the switches.
5) Pulse width modulation control device;
6) A device to measure some aspect of the electrical power or weld process;
7) A reference signal generator.

The battery provides the energy via the switching device to form the weld. The switching devices are turned on and off by the pulse width modulation controller at some predetermined frequency which may either be fixed or time varying. Switching is coordinated to achieve a desired orientation of current flow through a load. Some aspect of the weld is measured (weld power, voltage, and/or current), compared to a reference and used to adjust the ratio of the on/off time of the switches. Diode(s) provide a low impedance current path when the switches are non-conducting. The battery is charged via a charger connected to commercial power supply.

Other objects and features of the present invention will become apparent by a review of the specification, claims and appended figures.

DETAILED DESCRIPTION OF THE PREFERRED EMBODIMENTS

Figure 1:
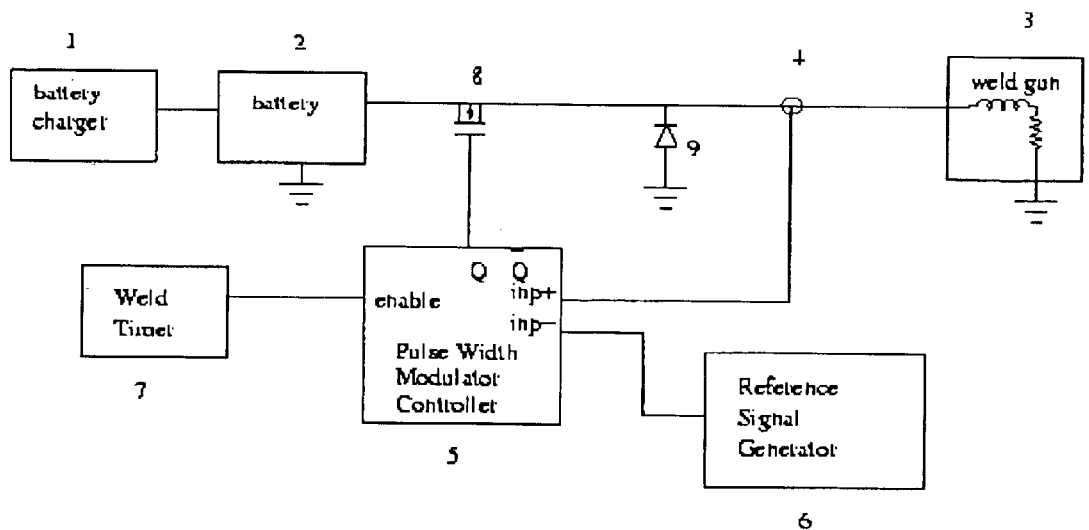
FIG. 1 shows one implementation of the present invention.
Figure 2:
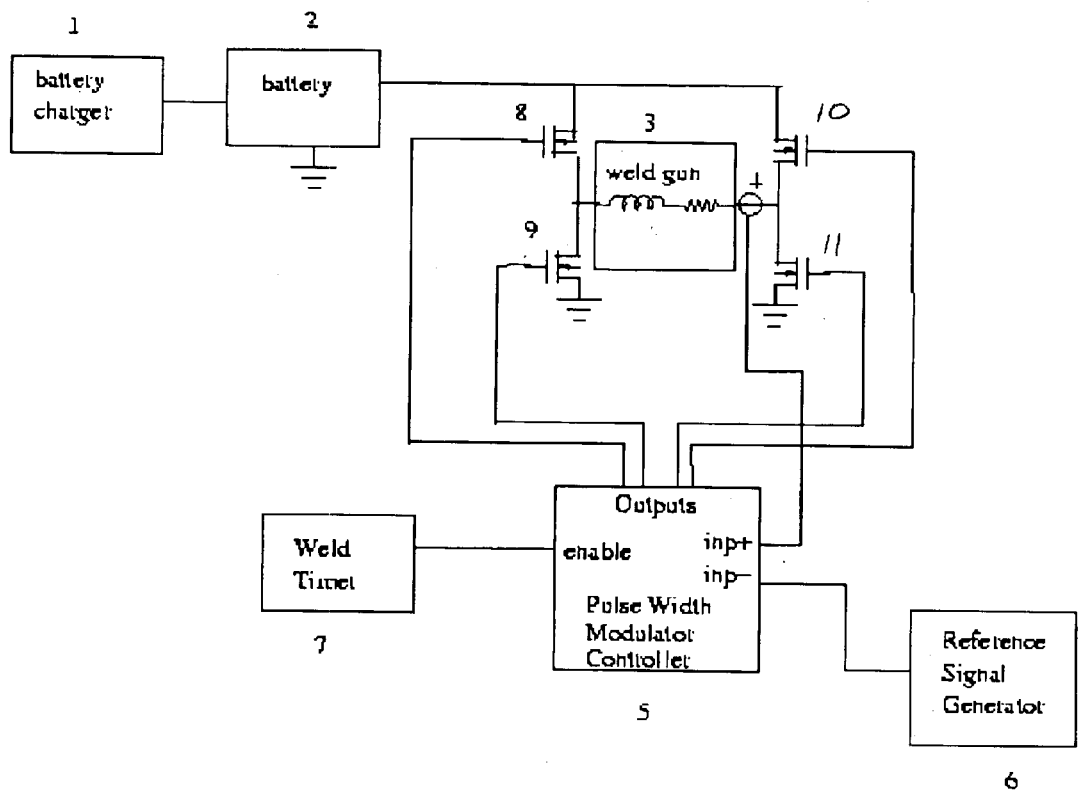
FIG. 2 shows a second implementation of the present invention.

FIG. 1 shows preferred implementation of the first aspect of the invention. A battery (2), possibly a 12V truck battery, supplies power to a weld gun (3) via power MOSFET switch (8). Device 4 can measure the current, voltage and/or the power delivered to the weld gun. A reference trajectory for this measured quantity is generated by (6). With this implementation this must always be a positive number. This trajectory could be generated by a lookup table with a micro-controller or generated by analog circuitry. The pulse width modulator controller (5) switches (8) at a fixed frequency with an on/off ratio automatically adjusted so that the signal measured by device (4) is equal to the signal generated by (6). Many commercially available ICs are able to perform this task. Diode 9 provides a low impedance path for current to flow through the weld gun while switch (8) is off. Note that weld guns (3) typically appear as a load with significant inductance and will naturally provide adequate filtering for the circuit. If this is not the case for a specific implementation, an optional inductor can be inserted between diode/switch and gun. A weld-timing signal can be generated by (7) and used to enable the pulse width modulation controller. The battery charger (1) keeps the battery as close as possible to its maximum capacity.

Figure 3:
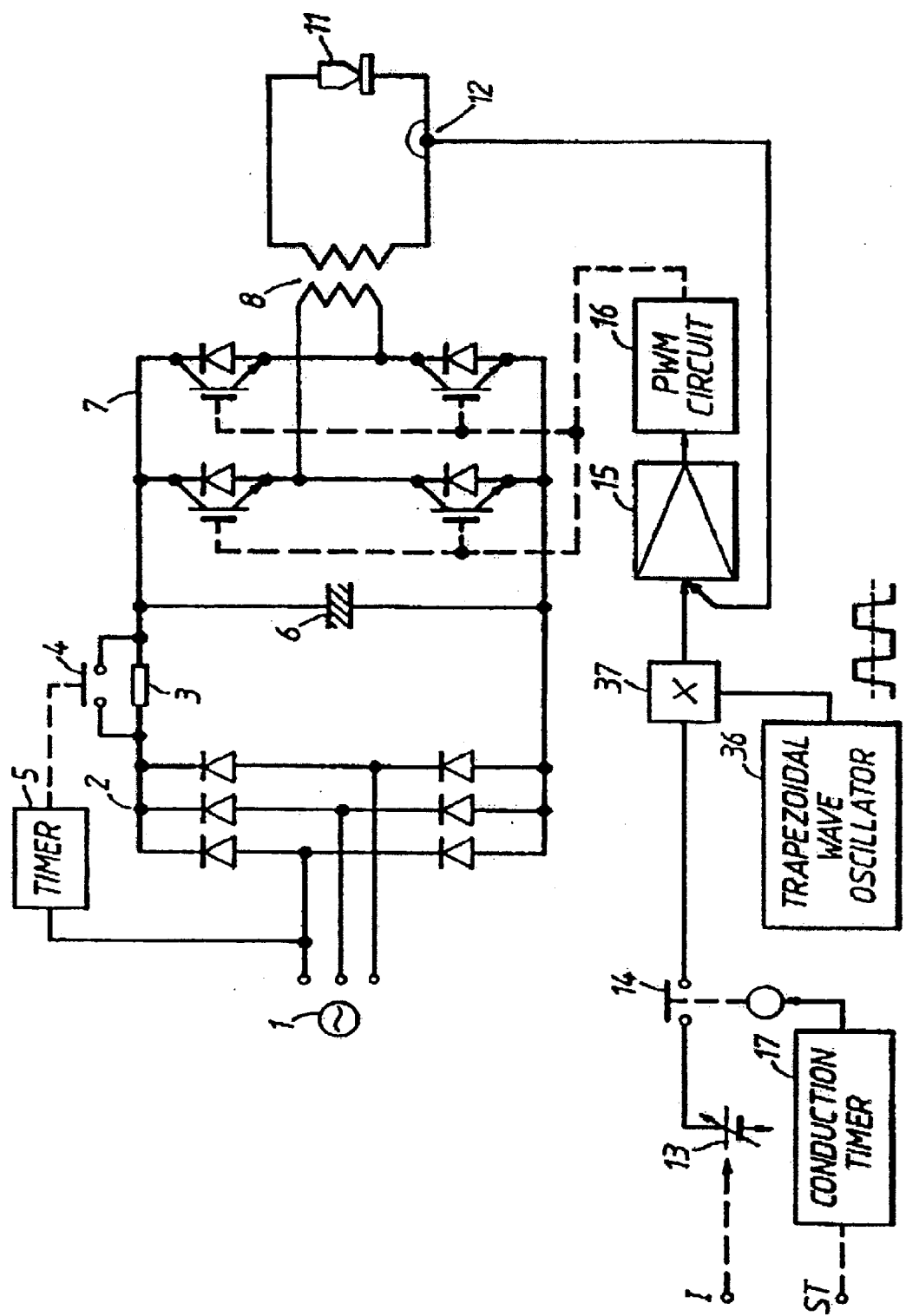
FIG. 3 shows one prior art implementation.
Figure 4:
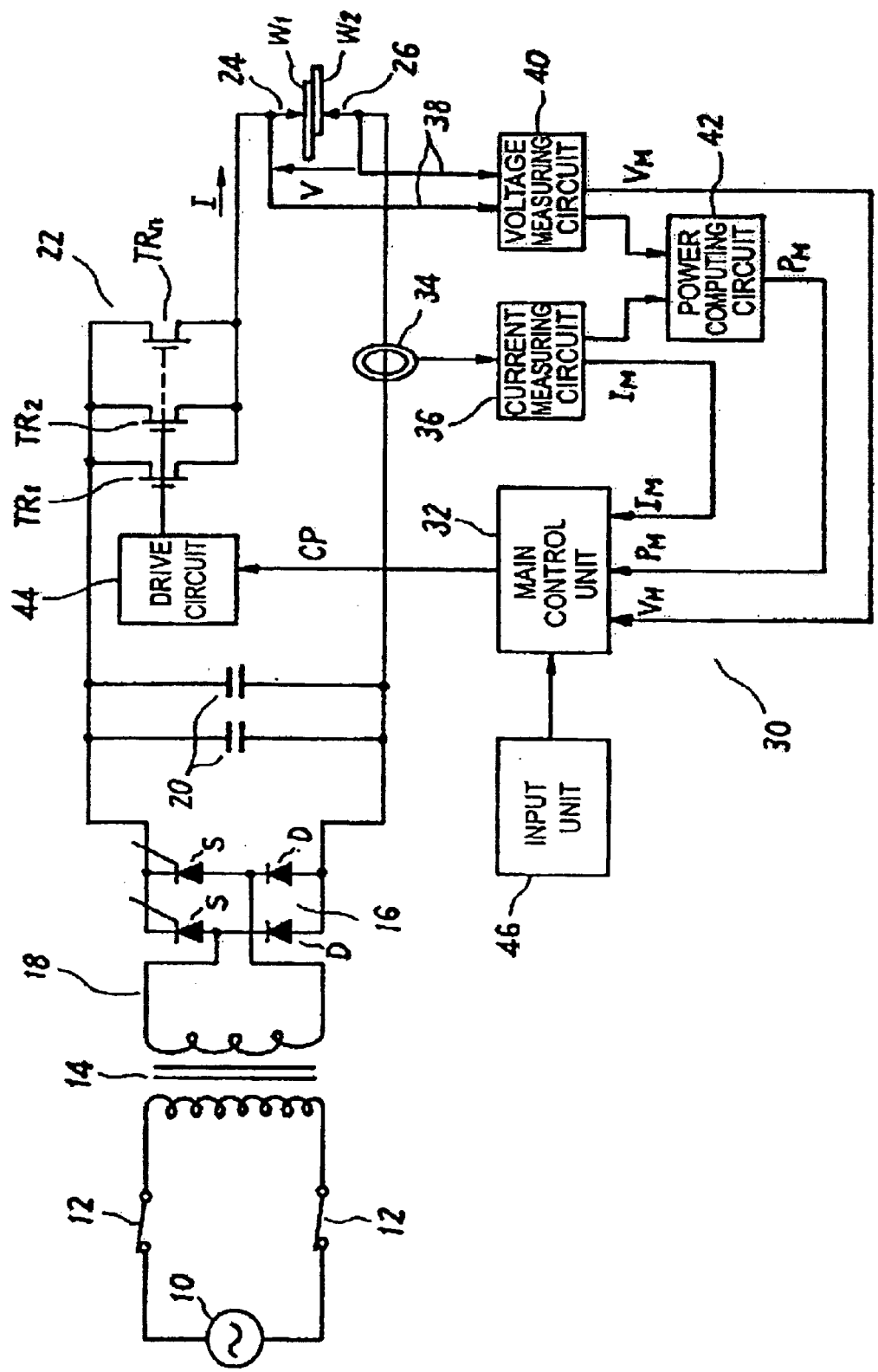
FIG. 4 shows a second prior art implementation.

An implementation of the second aspect of the invention is shown in FIG. 3. Parts (1)–(4) are the same as in FIG. 1, the implementation of the first aspect. Instead of a single switch and diode, 4 MOSFET switches (8)–(11) control the current flow in the weld gun (3). When the reference signal generator generates a positive signal, switch (11) is activated, switch (9) and (10) are deactivated and switch (8) is switched at a predetermined frequency. Switch (9) acts as a diode to provide a low impedance current path when switch (8) is off. Controller (5) adjusts the ratio between the on/off time of switch (8) to ensure the difference between the measurement of device (4) and reference signal from (6) is maintained at zero or as small as possible. When the reference signal generator generates a negative signal, switch (9) is activated, switch (8) and (11) are deactivated and switch (10) is switched at a predetermined frequency. Switch (11) acts as a diode to provide a low impedance current path when switch (10) is off. Controller (5) adjusts the ratio between the on/off time of switch (10) to ensure the sum of the measurement of device (4) and reference signal from (6) is maintained at zero or as small as possible.

It is to be understood that the present invention is not limited to the embodiment(s) described above and illustrated herein, but encompasses any and all variations falling within the scope of the appended claims. For example, in the above description and below in the claims, an inductor can be a conventional inductor as well as the inherent inductance of conductive elements such as wires or the weld head.

What is claimed is:

1. A power supply for a resistance welding machine that is connectable to a weld load, comprising:
    a battery;
    a battery charger;
    an inductor;
    a switch having a closed state for passing electrical current from the battery to the inductor and the weld load, and having an open state for prohibiting the passing of electrical current from the battery to the inductor and the weld load; and
    a device to provide an alternative current path for the inductor and the weld load when the switch is in the open state.

2. The power supply according to claim 1, wherein the switch includes multiple devices placed in parallel.

3. The power supply according to claim 1, wherein the switch is configured as a pulse width modulation circuit.

4. The power supply according to claim 3, wherein pulse widths of the current flow are preset to fixed duty cycles.

5. The power supply according to claim 3, wherein pulse widths of the current flow are adjusted based on a voltage measured at an output of the power supply.

6. The power supply according to claim 3, wherein pulse widths of the current flow are adjusted based on a voltage measured at welding electrodes or any point in a weld circuit connected to the power supply.

7. The power supply according to claim 3, further comprising:
    a device for measuring the current flow, wherein pulse widths of the current flow are adjusted in response to the device for measuring the current flow.

8. The power supply according to claim 3, further comprising:
    a device for measuring the current flow, wherein pulse widths of the current flow are adjusted based on the product of the current flow measured by the current flow measuring device and a measured voltage.

9. The power supply according to claim 3, further comprising:
    a device for measuring the current flow, wherein pulse widths of the current flow are adjusted based on a mathematical calculation involving the current flow measured by the current flow measuring device and a measured voltage.

10. A power supply for a resistance welding machine, comprising:
    a battery;
    a battery charger;
    an inductor;
    a first pair of switches for controlling a direction of current flow between the battery and the inductor;
    a second pair of switches for controlling an amount of the current flow between the battery and the inductor; and
    devices for providing an alternative current path when the second pair of switches are in an open state.

11. The power supply according to claim 10, wherein the first and second pairs of switches are configured as a pulse width modulation circuit.

12. The power supply according to claim 11, wherein pulse widths of the current flow are preset to fixed duty cycles.

13. The power supply according to claim 11, wherein pulse widths of the current flow are adjusted based on a voltage measured at an output of the power supply.

14. The power supply according to claim 11, wherein pulse widths of the current flow are adjusted based on a voltage measured at welding electrodes or any point in a weld circuit connected to the power supply.

15. The power supply according to claim 11, further comprising:
a device for measuring the current flow, wherein pulse widths of the current flow are adjusted in response to the device for measuring the current flow.

16. The power supply according to claim 11, further comprising:
a device for measuring the current flow, wherein pulse widths of the current flow are adjusted based on the product of the current flow measured by the current flow measuring device and a measured voltage.

17. The power supply according to claim 11, further comprising:
a device for measuring the current flow, wherein pulse widths of the current flow are adjusted based on a mathematical calculation involving the current flow measured by the current flow measuring device and a measured voltage.

18. A power supply for connecting to a weld head having an inductance and a weld load, comprising:
a battery;
a battery charger;
a switch having a closed state for passing electrical current from the battery to the weld head, and having an open state for prohibiting the passing of electrical current from the battery to the weld head; and
a device to provide an alternative current path for the weld head when the switch is in the open state.

19. The power supply according to claim 18, wherein the switch includes multiple devices placed in parallel.

20. The power supply according to claim 18, wherein the switch is configured as a pulse width modulation circuit.

21. The power supply according to claim 20, wherein pulse widths of the current flow are preset to fixed duty cycles.

22. The power supply according to claim 20, wherein pulse widths of the current flow are adjusted based on a voltage measured at an output of the power supply.

23. The power supply according to claim 20, wherein pulse widths of the current flow are adjusted based on a voltage measured at welding electrodes or any point in a weld circuit connected to the power supply.

24. The power supply according to claim 20, further comprising:
a device for measuring the current flow, wherein pulse widths of the current flow are adjusted in response to the device for measuring the current flow.

25. A resistance welding machine, comprising:
a battery;
a battery charger;
an inductor;
a weld load;
a switch having a closed state for passing electrical current from the battery to the inductor and the weld load, and having an open state for prohibiting the passing of electrical current from the battery to the inductor and the weld load; and
a device to provide an alternative current path for the inductor and the weld load when the switch is in the open state.

26. The machine according to claim 25, wherein the switch includes multiple devices placed in parallel.

27. The machine according to claim 25, wherein the switch is configured as a pulse width modulation circuit.

28. The machine according to claim 27, wherein pulse widths of the current flow are preset to fixed duty cycles.

29. The machine according to claim 27, wherein pulse widths of the current flow are adjusted based on a voltage measured at an output of the power supply.

30. The machine according to claim 27, wherein pulse widths of the current flow are adjusted based on a voltage measured at welding electrodes or any point in a weld circuit connected to the power supply.

31. The machine according to claim 27, further comprising:
a device for measuring the current flow, wherein pulse widths of the current flow are adjusted in response to the device for measuring the current flow.

* * * * *